G. VELTING, Sr., AND G. VELTING, Jr.
TIRE.
APPLICATION FILED APR. 13, 1921.
1,431,345.
Patented Oct. 10, 1922.
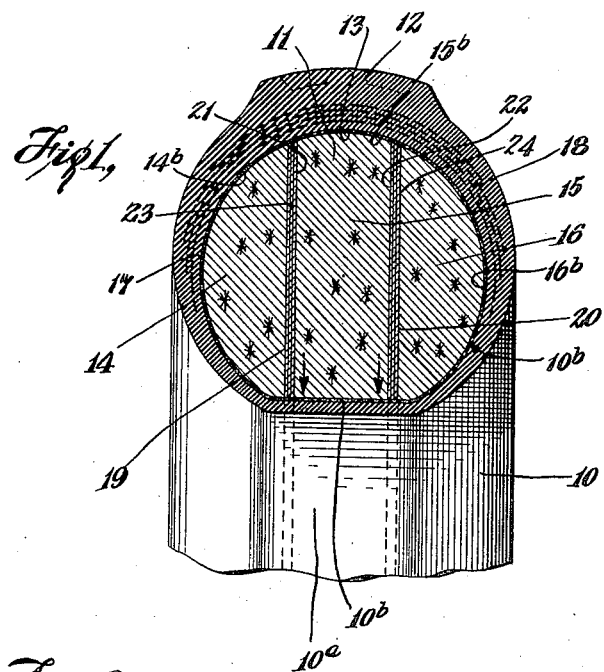
Fig. 1,
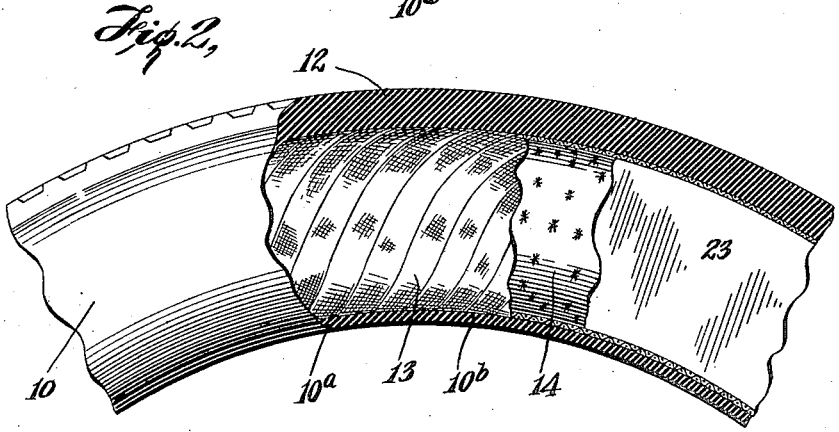
Fig. 2,
GEORGE VELTING SR.
GEORGE VELTING JR.
INVENTORS
BY
ATTORNEY Patented Oct. 10, 1922.

1,431,345

UNITED STATES PATENT OFFICE.

GEORGE VELTING, SR., AND GEORGE VELTING, JR., OF SCARSDALE, NEW YORK.

TIRE.

Application filed April 13, 1921. Serial No. 461,142.

*To all whom it may concern:*

Be it known that GEORGE VELTING, Sr., and GEORGE VELTING, Jr., citizens of the United States, and residents of the city of Scarsdale, in the county of Westchester and State of New York, have invented certain new and useful Improvements in Tires, of which the following is a specification.

This invention relates to tires.

More particularly, this invention relates to tires in which the inner tube is dispensed with and the corresponding pneumatic functioning and necessary resiliency supplied by a novel core.

One object thereof is to provide a tire of the character described which shall be light, and simple in construction, and inexpensive to manufacture and efficient in its operation to a high degree.

Another object is to provide a tire of the character described which shall positively maintain its shape under and resist distortion due to the weight of the truck or vehicle.

Other objects of this invention will in part be obvious and in part hereinafter pointed out.

The invention accordingly consists in the features of construction, combinations of elements and arrangement of parts which will be exemplified in the construction hereinafter described and of which the scope of invention will be indicated in the following claims.

In the accompanying drawings, in which is shown one of various possible illustrative embodiments of this invention.

Fig. 1 is a partial vertical sectional view of a tire embodying this invention; and Fig. 2 is a partial side elevation of this view partly in section and partly broken away to show the interior construction.

Referring in detail to the drawing, the tire there shown is seen to comprise an outer casing 10, an inner core 11 adapted to replace the usual inner air and which will hereinafter be more fully described.

The outer casing 10 comprises a comparatively heavy rubber tread 12 and interior layers 13 of duck or canvas. This casing 10 is not completely circular in interior cross-section but the surface $10^a$ thereof that rests on the rim base and the corresponding interior surface $10^b$ are flat or horizontal in cross-section for the purpose hereinafter more fully described.

The inner core 11 is made of a material adapted to give sufficient resiliency to correspond to the pneumatic functioning of an inflated air tube, and at the same time be of low specific gravity so as to give a light core. Preferably cork as shown in the embodiment herein described may be used for this core. The core is built up of a plurality of sections 14, 15 and 16 of the material suitably held together to form a complete ring, such for example as would appear if in Fig. 2 the complete tire were shown instead of the fragmental portion thereof. The sections such as 14, 15, and 16 it will be seen are thus complete members in themselves, the extreme or end sections 14 and 16 having convex outer surfaces as shown at 17, 18, to conform to the inner curvature of the outer casing 10, and flat inner faces 19, 20, while the intermediate section such as 15 have their faces flat as shown at 21, 22. These sections are further so shaped that their faces $14^b$, $15^b$, $16^b$ in contact with the inner surface $10^b$ of the casing conform in contour to said inner surface. In order to reinforce the core so that it may withstand and resist distortion under the weight of the core body, reinforcing members 23, 24 are inserted between the sections 14, 15 and 16. These may be made of any suitable material having strong resistive property to re-act against and support the weight acting on the tire. In the embodiment shown in the drawing, these reinforcing members comprise a plurality of vertically disposed annular layers of the reinforcing material such as a three or four-ply veneer which we have found by experiment to effectively serve the purpose of reinforcing the core so as to prevent its distortion under pressure. As will be readily understood the weight of the vehicle is transmitted vertically through the core as indicated by the arrows in Fig. 1. The surfaces $10^a$ and $10^b$ of the casing and $14^b$, $15^b$ $16^b$ of the core section are at all points normal to this weight or pressure, and to the reinforcing members, thus giving an equal reaction transmitted through the latter adapted to prevent distortion of the core. These reinforcing members serve at the same time also to hold the various sections of the core together, glue being applied to the surface of the reinforcing members and the adjacent surface of the core sections so that when assembled a complete solid core results, being very light in weight, having the necessary resilient properties and suitably reinforced so that it may maintain its shape under hard use. The core illustrated in the drawing is shown as made up of three sections and will serve well for lighter types of vehicle, but of course where heavier tires are required for heavier traction purposes, a corresponding larger core would be provided made up in a larger number of sections with a corresponding larger number of intermediate sections so as to give the necessary strength.

It will thus be seen that there is provided a tire in which the several objects of this invention are achieved and which is well adapted to meet the conditions of parctical use.

As various possible embodiments might be made of the above invention and as various changes might be made in the embodiment above set forth, it is to be understood that all matter herein set forth or shown in the accompanying drawings is to be interpreted as illustrative and not in a limiting sense except in so far as defined by the scope of the appended claims.

Having thus described my invention, I claim as new and desire to secure by Letters Patent:—

1. A vehicle tire comprising an outer casing and a solid inner core of light resilient material comprised of continuous annular sections, made of cork, the outer ones of which are curved to conform to the inner contour of said outer casing, reinforcing members comprising annular layers of veneer disposed substantially vertically between said sections, said reinforcing means serving also as the means for holding the sections together to form a unitary solid core.

2. In a tire, a solid inner core made of cork and means for reinforcing said core to maintain its shape under pressure, comprising annular partitions of substantially vertically layers of veneer running circumferentially of the core.

Signed at New York city, in the county and State of New York, this 9th day of April, 1921.

GEORGE VELTING, Sr.
GEORGE VELTING, Jr.